March 16, 1943. P. J. DAVIS 2,314,130
CHAIR
Filed Feb. 24, 1940 6 Sheets-Sheet 1

Inventor
P. J. Davis
by
W. E. Evans
Attorney.

March 16, 1943.　　　　P. J. DAVIS　　　　2,314,130
CHAIR
Filed Feb. 24, 1940　　　　6 Sheets-Sheet 2

Inventor
P. J. Davis:
by
W. S. Evans:
Attorney.

March 16, 1943.  P. J. DAVIS  2,314,130
CHAIR
Filed Feb. 24, 1940  6 Sheets-Sheet 4

Inventor
P. J. Davis
by W. S. Evans
Attorney.

March 16, 1943.  P. J. DAVIS  2,314,130
CHAIR
Filed Feb. 24, 1940  6 Sheets-Sheet 5

Inventor
P. J. Davis
by
W. E. Evans
Attorney.

March 16, 1943. P. J. DAVIS 2,314,130
CHAIR
Filed Feb. 24, 1940 6 Sheets-Sheet 6

Inventor
P. J. Davis:
by
W. E. Evans
Attorney.

Patented Mar. 16, 1943

2,314,130

UNITED STATES PATENT OFFICE 2,314,130

CHAIR

Peter James Davis, Streatham, London, England

Application February 24, 1940, Serial No. 320,698
In Great Britain February 22, 1939

13 Claims. (Cl. 155—88)

This invention relates to chairs of the kind in which the seat may be removed from one position in which it is high to another position in which it is low, whereby the chair so adapted is capable, for example, of use by a person sitting conveniently at a table of normal height while in the alternative position of the seat at the lower elevation the chair is capable of use by a person sitting in a reclining position, the back of the person being supported in both positions of the seat.

The invention has among its objects to provide simplified constructions of such chairs, to provide for the alteration of the position of the seat to be accompanied by variation of size of the seat, and generally to provide constructions of chair in which the change of position of the seat is not accompanied by undue changes of elevation of the seat.

According to the invention the chair comprises a supporting frame consisting of lateral frame parts of similar form disposed in fixed parallel relation and seat and back parts that are combined or integrally formed, the said seat and back parts being mounted in such disposition upon the supporting frame that the required alternative positions of the seat may be secured by suitable variation of the relative disposition of the supporting frame and the combined seat and back parts.

The invention may be carried into effect in a number of ways. Thus, the seat and back parts may be pivoted upon the supporting frame in such manner that the pivotal axis is adapted for a limited travel or change of position in relation to the lateral frame parts of the supporting frame, while at the same time the combined seat and back parts may be adapted for a reversal of position by rotation through a determined angle so that in one position required of the seat the seat part functions as the back part and the back part as the seat part.

Again, according to a modified construction the supporting frame may be adapted to rest upon the ground surface alternatively by means of two adjoining sides of the lateral frame parts in such manner that either of the said sides of the lateral frame parts rest upon the ground surface when the supporting frame is turned through the angle and at the same time the combined seat and back parts may also rotate about a pivotal axis so that the change of function of the seat part and back part also takes place. In certain instances, however, such change of function of the seat and back parts by a pivotal movement through a determined angle may be rendered unnecessary.

Where it is required that the pivotal axis of the combined seat and back parts should be adjusted in position such result may be secured by a pin and slot connection of the pivots between the combined seat and back parts and the supporting frame; or such adjustment of position of the pivotal axis may be effected by providing the pivots between the combined seat and back parts of the supporting frame to be received into corresponding slots according to the position which the combined seat and back parts are desired to take up upon the supoprting frame. It will be understood that the pivots may be provided upon the combined seat and back parts and the slot or slots in the supporting frame or vice versa.

The pivotal axis of the combined seat and back parts upon the supporting frame may be disposed inside the angle formed between the seat part and back part or may be outside such angle according to the particular design of chair that is under consideration.

It may be desirable in certain constructions of the chair to provide the seat part and back part to be adjustable in position one to the other.

The invention further comprises the details of construction hereinafter described.

The invention is illustrated by way of example diagrammatically in the accompanying drawings.

In the examples of construction represented in the drawings there are illustrated either singly or in combination three factors governing the change of elevation of the seat, the first being the difference in the distance of the pivotal axis from the upper surfaces of the seat part and the back part, the second being the difference of the distance of the pivotal axis from those sides of the supporting frame which may be adapted to rest upon the ground surface and the third being a relative movement of the pivotal axis in relation either to the seat part and the back part or the supporting frame.

In carrying the invention into effect according to one construction of chair, as illustrated in Figures 1 to 4 of the accompanying drawings, the combined or integral seat part $a$ and back part $b$ are provided with a transverse rod forming by its projecting ends the pivots $c$ by which the combined seat and back parts are mounted upon the supporting frame $d$ which comprises two similar lateral frame parts $d^1$ disposed in spaced and parallel positions and connected together by suitable stays or tie members. The pivots $c$ are received into longitudinal channels $d^2$ in the upper members of the lateral frame parts $d^1$, which channels connect with longitudinal channels $d^3$ formed in the upper parts of the front members of the lateral frame parts $d^1$.

Figure 1:
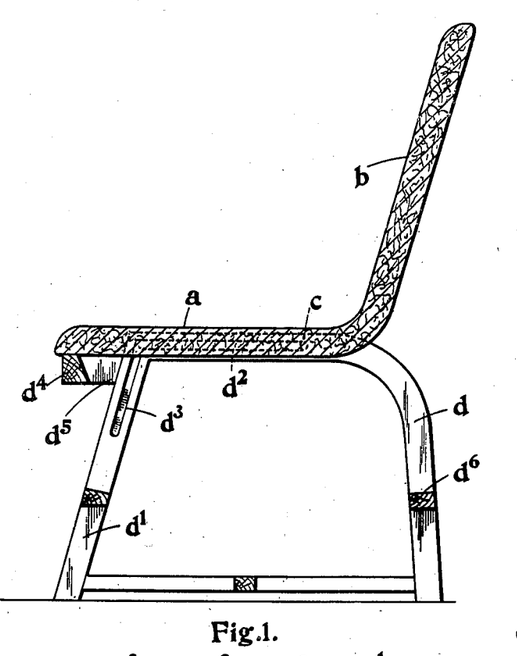
Figure 1 is a longitudinal section on the line 1—1 of Figure 2 of a chair constructed according to the invention, having the seat part and back part capable of exchanging functions, the seat being illustrated in the higher position.
Figure 2:
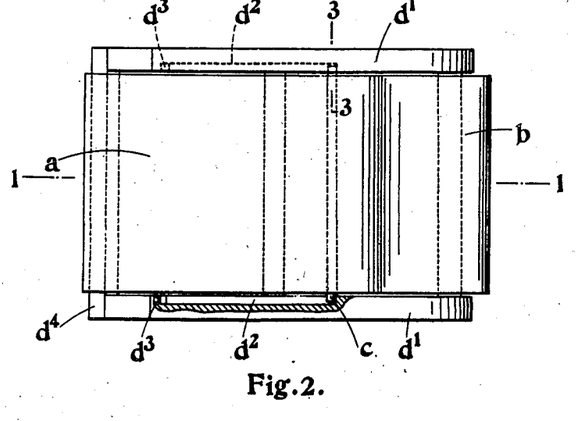
Figure 2 is a plan view partly in section corresponding to Figure 1.
Figure 3:
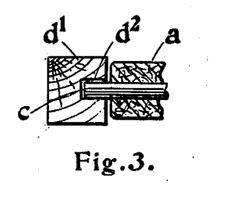
Figure 3 is a detail transverse cross-section on the line 3—3 of Figure 2 to an enlarged scale.
Figure 4:
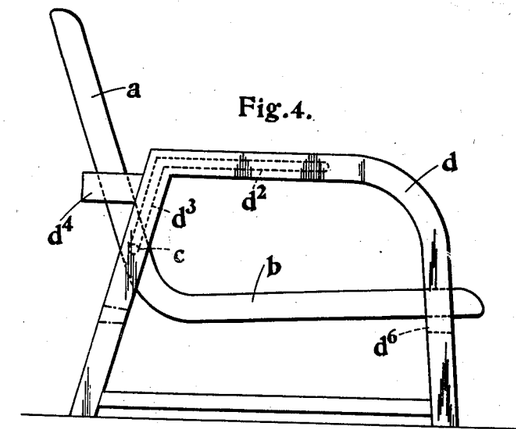
Figure 4 is a side elevation of the chair represented in Figures 1 and 2 illustrated with the seat in the lower position.

In the disposition of the chair parts for a high seat, as illustrated in Figure 1, the seat part $a$ and the back part $b$ are positioned with the pivots $c$ at the rear ends of the channels $d^2$ and the forward end of the seat part $a$ supported upon a transverse frame member $d^4$ carried by arms $d^5$ projecting from the forward edges of the lateral frame parts $d^1$. When a low seat is required the disposition of the chair parts is that illustrated in Figure 4. The seat part $a$ and the back part $b$ are adjusted in position upon the supporting frame $d$ so that the pivots $c$ are caused to travel, in the direction of the broken arrow in Figure 1, along the channels $d^2$ into the channels $d^3$ and to be lowered to the bottom of the said channels. At the same time the seat part $a$ and the back part $b$ are turned, in the direction of the arrow in Figure 1, about the pivots so that the upper part of the back $b$ now rests upon the rear stay $d^6$ of the supporting frame, while the seat part $a$ which now functions as the back may rest against the inner face of the transverse frame member $d^4$ which may be bevelled or inclined accordingly.

Securing means such as bolts, clips or the like, may be provided for securing the combined seat part and back part in either position of adjustment upon the supporting frame. Thus, for example, in the disposition represented in Figure 1 the seat part $a$ may be secured to the transverse frame member $d^4$, while in the disposition represented in Figure 4 the back part $b$ may be secured to the rear stay $d^6$.

In order to facilitate removal of the combined seat part and back part for stacking or storing or transport, the transverse rod $c$ may be removable from the combined seat and back portion or means may be provided for the removal of the rod $c$ from the channels $d^2$ or $d^3$. This result may be secured, for example, by extending the channels $d^2$ to the forward edges of the lateral frame parts or the channels $d^3$ to the upper edges of the lateral frame parts or by forming at suitable positions slots whereby the pivots $c$ may enter or leave either of the channels.

Figures 5, 7:
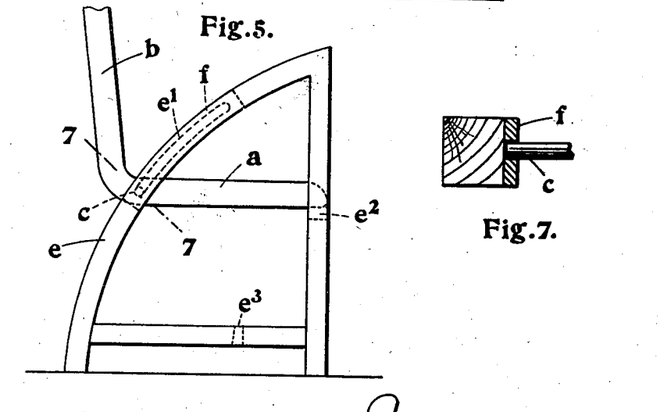
Figure 5 is a side elevation of a modified construction of chair in which the supporting frame is adapted to be turned through 90° and the seat part and back part are adapted for exchange of function, the seat being illustrated in the higher position.
Figure 7 is a detail transverse cross-section on the line 7—7 of Figure 5.
Figure 6:
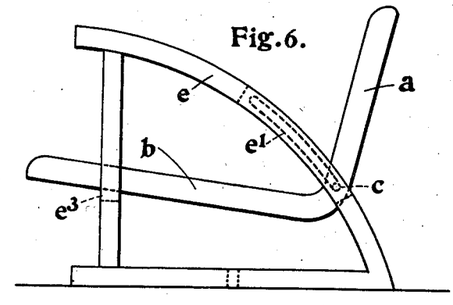
Figure 6 is a side elevation of the chair illustrated in Figure 5, the seat being set at the lower elevation.

In the modified construction of chair represented in Figures 5 to 7 the pivots $c$ of the combined seat part $a$ and back part $b$ are received into channels $e^1$ extending longitudinally in arcuate frame members $e$ of the lateral frame parts of the supporting frame so that in the disposition of the chair parts for a high seat, as illustrated in Figure 5, the pivots $c$ are disposed at the lower ends of the slots $e^1$ and the forward end of the seat part $a$ is received upon a transverse frame part $e^2$ of the supporting frame that is disposed in an intermediate position in the length of the forward frame members of the lateral frame parts. Thus, the upper parts of the lateral frame parts serve as arms. When a low seat is required the disposition of the chair parts becomes that illustrated in Figure 6. In this disposition the supporting frame is turned through 90° so that it now rests upon the ground surface by means of the forward frame members, while at the same time the pivots $c$ are caused to travel to the opposite ends of the channels $e^1$ and the combined seat part $a$ and back part $b$ are rotated about the pivots so that the back part $b$ now functions as the seat and is supported towards the forward end upon a transverse frame member or stay $e^3$ of the supporting frame. Here again the combined seat part and back part according to its disposition may be secured, for example, to the transverse frame members $e^2$ or $e^3$.

The channels $e^1$ in the construction now described or in fact the channels of any construction of chair according to the invention may, if desired, be formed in metal plates such as $f$ (Figure 7) that are secured to the inner sides of the lateral frame parts. It will be understood also that in order that the forward frame member may not rest directly in contact with the ground surface suitable extensions of the arcuate frame members and of the bottom frame members from the front surface of the forward frame member may be provided or the equivalent in the form of studs or the like may be carried upon the forward frame members.

Figure 8:
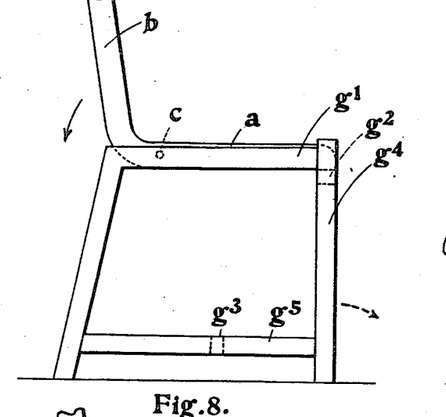
Figures 8 and 9 are side elevations of a modified construction of chair in which the pivotal axis is of fixed position in relation to the seat part and back part and the supporting frame, the seat being illustrated in the two views at the higher and lower elevations respectively.
Figure 9:
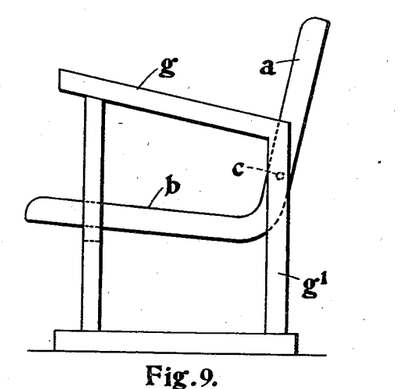

In the construction represented in Figures 8 and 9 the seat part $a$ and the back part $b$ have their pivots $c$ disposed in determined positions in the upper frame members $g^1$ of lateral frame parts that are of a substantially rectangular form and that are provided with stays or tie members $g^2$, $g^3$ only between the forward frame members $g^4$ and the lower frame members $g^5$. The disposition of the parts of the chair for the high seat position is illustrated in Figure 8. The forward end of the seat part $a$ then rests upon and may be secured to the stay or tie member $g^2$. For the low seat position the supporting frame is turned in the direction of the broken arrow in Figure 8 to position the forward frame member $g^4$ upon the ground surface, while the seat part $a$ and the back part $b$ are rotated upon the pivot $c$ in the direction of the full line arrow in Figure 8 so that the upper part of the back part $b$ comes to rest upon the stay or tie member $g^3$ and may be secured thereto and the back part then functions as the seat. The rear frame members now serve as arms.

Figure 10:
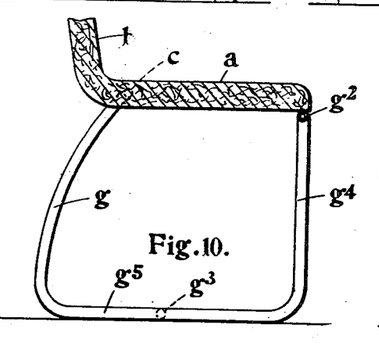
Figures 10 and 11 are sectional and side elevations respectively of a tubular frame chair similar in construction to the chair represented in Figures 8 and 9.
Figure 11:
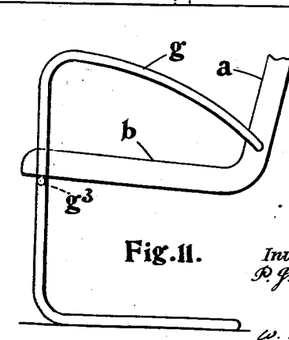

Figures 10 and 11 illustrate a tubular frame chair of characteristics similar to those of the chair illustrated in Figures 8 and 9. The lateral frame parts of the supporting frame are formed integrally by the tie member $g^2$, while similarly the pivots $c$ may be formed by the upper extremities of the rear frame parts $g$. The transverse tie member $g^3$ is connected between the lower frame members $g^5$.

Figure 12:
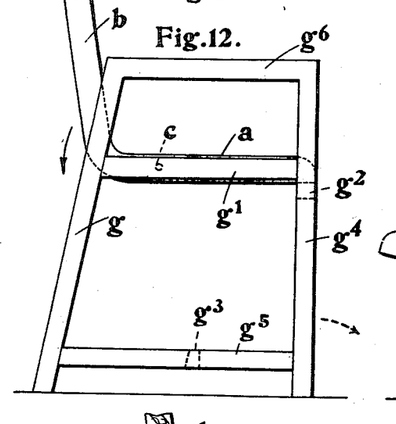
Figures 12 and 13 are side elevations of a further modification of construction of chair having the seat illustrated at the higher and lower elevations respectively.
Figure 13:
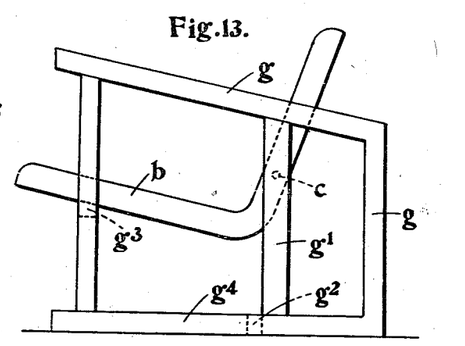

The construction of chair represented in Figures 12 and 13 is identical with that represented in Figures 8 and 9 with the exception that the frame members $g$ and $g^4$ of the lateral frame parts are continued upwardly above the frame member $g^1$ and are connected by arm members $g^6$. This construction affords increased stability in the disposition of the chair parts for the low seat position.

Figure 14:
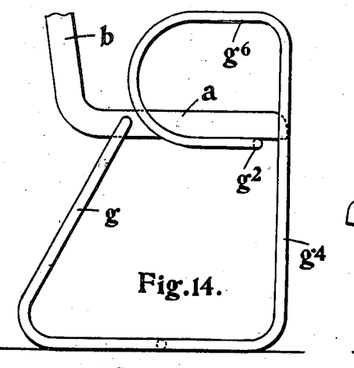
Figures 14 and 15 are side elevations of a tubular frame chair of construction similar to that of the chair represented in Figures 12 and 13.
Figure 15:
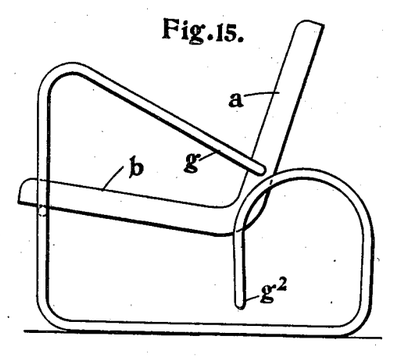

Figures 14 and 15 illustrate a tubular frame chair bearing the same relation to the tubular frame chair of Figures 10 and 11 that is borne by the construction of chair illustrated in Figures 12 and 13 to that illustrated in Figures 8 and 9. In this construction the tie member $g^2$ by which the lateral frame parts of the supporting frame are rendered integral is connected between extensions of frame members $g^4$ that are extended upwardly and carried rearwardly and downwardly for the formation of the arms $g^6$.

Figure 16:
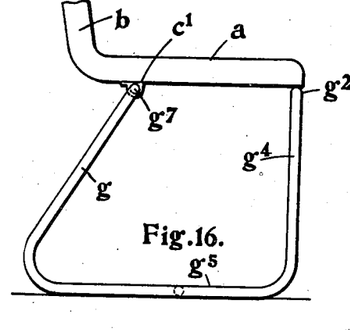
Figures 16 and 17 are side elevations of a construction of tubular frame chair in which the pivotal axis of the combined seat part and back part is disposed outside the angle between the said parts and the said parts are adapted for rotation through an angle for exchange of their respective functions.
Figure 17:
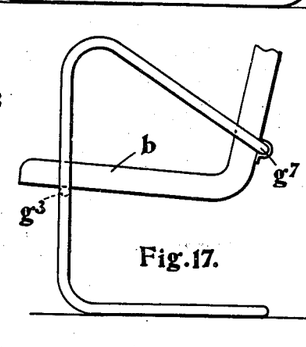

Figures 16 and 17 illustrate a modification in construction of the tubular frame chair represented in Figures 10 and 11, in which the pivots are represented by a transverse tie member $g^7$ connecting the lateral frame parts at the upper ends of the frame members $g$ and received into bearing elements $c^1$ fitted to the lower face of the seat part $a$. The manner of adjustment between the high and low seat positions is the same as for the chair represented in Figures 10 and 11, but by reason of the fact that the pivotal axis is outside the angle formed between the seat part $a$ and the back part $b$ the seat part $a$ and back part $b$ are moved slightly forward in the low seat disposition to improve the stability of the chair.

Figure 18:
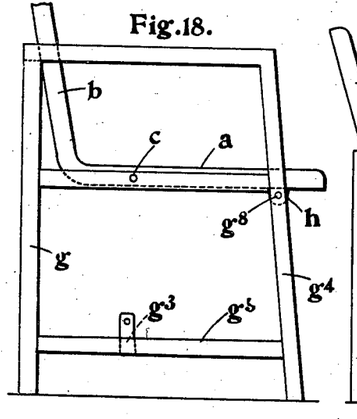
Figures 18 and 19 are side elevations of a further modification of construction of the chair in which the change of elevation of the seat is effected by rotation of the supporting frame through 90°, the combined seat and back parts maintaining their angular disposition in relation to the ground surface.
Figure 19:
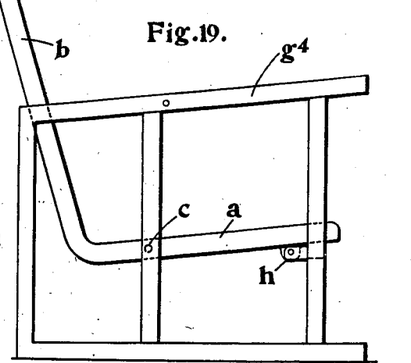

Figures 18 and 19 illustrate a construction of chair in which the seat part $a$ retains its disposition in the high and low seat positions. The lateral frame parts are substantially similar to the lateral frame parts of the chair represented in Figures 12 and 13 with the exception that the tie members $g^2$ are necessarily omitted and the supporting frame is required to turn in the direction of the broken line arrow in Figure 18 so that for the low seat position the rear frame members $g$ rest upon the ground surface and the frame members $g^4$ become the arms. By reason of the relative movement of the seat part $a$ and back part $b$ on the one hand and the supporting frame on the other, the seat part $a$ cannot be supported forwardly by a tie member of the supporting frame. It is therefore necessary that removable means of support for the seat part should be provided. Such means may comprise bolts or latches $h$ or spring catches that are adapted to engage in sockets or holes $g^8$ suitably positioned in the forward frame members $g^4$ for the high seat position and in the members $g^3$ for the low seat position.

Figure 20:
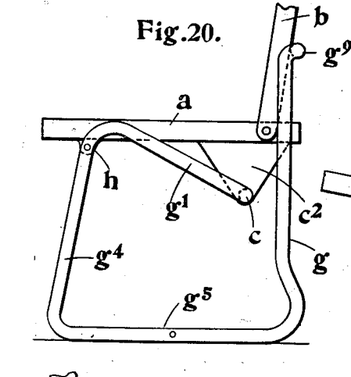
Figures 20 and 21 are side elevations of a tubular frame chair in which the pivotal axis of the combined seat part and back part is outside the angle of the said parts and the said parts do not exchange their functions in the adjustment of position of the seat.
Figure 21:
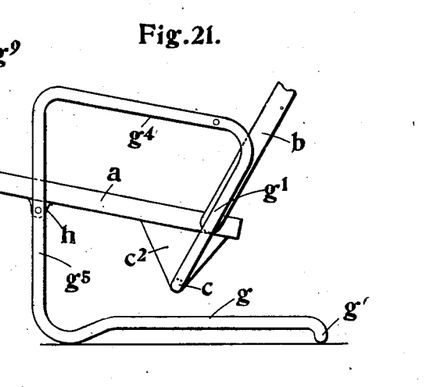

Figures 20 and 21 illustrate a tubular frame chair having characteristics similar to those of the chair represented in Figures 18 and 19 in that the seat part $a$ retains its disposition in the high and low seat positions. The lateral frame members are rendered integral by the connection of the upper ends of the frame members $g$ by a transverse connecting member $g^9$ which in the high position of the seat part $a$ serves as a rest for the back part $b$. In order to secure stability in each position of the seat part $a$ and suitable disposition of the seat part $a$ in relation to the ground surface the pivots $c$ which may be in the form of a transverse connecting member of the lateral frame parts are positioned in brackets $c^2$ on the under surface of the seat part $a$ so that the pivotal axis is outside the angle formed between the seat part $a$ and the back part $b$. In the high position, the seat part $a$ may be supported upon the frame member $g^4$ of the lateral frame parts by latches or bolts or the like $h$, as in the construction represented in Figures 18 and 19. The said latches or bolts may also serve to secure the seat part $a$ to the frame members $g^5$ in the low position of the seat part $a$. In this construction of chair also there is illustrated adjustability of the seat part $a$ and the back part $b$ which are formed as distinct parts that are pivoted or otherwise connected together to permit relative adjustment. In the low position of the seat part $a$ the back part $b$ may be supported from the frame members $g^1$ in any suitable manner.

Figure 22:
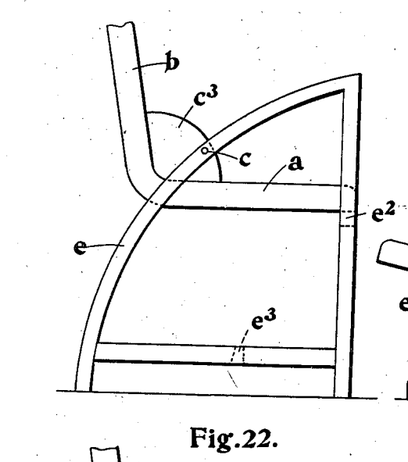
Figures 22 and 23 are side elevations of a construction of chair in which the pivotal axis of the combined seat part and back part is inside the angle of the said parts.
Figure 23:
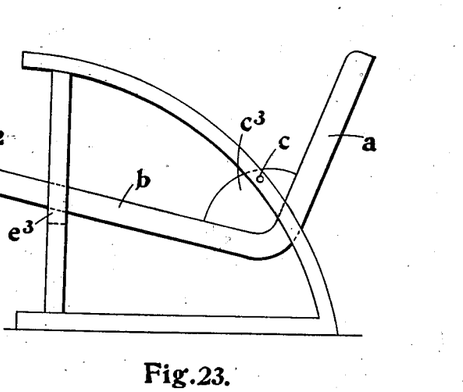

Figures 22 and 23 illustrate a construction of chair which follows the form of chair represented in Figures 5 to 7. In this case, however, the pivots $c$ are positioned within the angle formed between the seat part $a$ and the back part $b$ and are engaged in brackets $c^3$ disposed in the said angle. By said disposition of the pivots $c$ the necessity for the adjustment of the pivots along channels in the arcuate frame member $e$ in the change of disposition of the chair parts from the high seat position to the low seat position is avoided.

Figure 24:
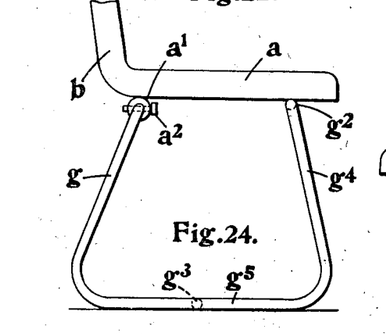
Figures 24 and 25 are side elevations of a construction of chair in which the combined seat part and back part take up a position in relation to the supporting frame in the adjustment from the higher seat position to the lower seat position in which the seat part is disposed at an angle of 180° to its initial position relatively to the frame.
Figure 25:
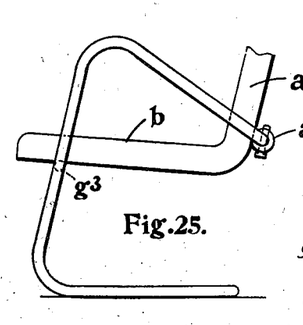

Referring to Figures 24 and 25 there is illustrated a construction of chair with tubular frame substantially similar to the construction represented in Figures 10 and 11. In this construction, however, the disposition of the seat part upon the supporting frame and the form of the latter is such that in the change from the higher seat position to the lower seat position the seat part $a$ is rotated precisely through an angle of 180°. This fact is of assistance in permitting the provision of a simple lock for the chair parts in each position, since diametrical holes in the bearing sleeves $a^1$ which are in alignment with a hole through the pivotal portions of the supporting frame are brought again into alignment with the said holes in the second position of the seat part $a$ and thus in both positions will receive a simple locking bolt $a^2$.

Figure 26:
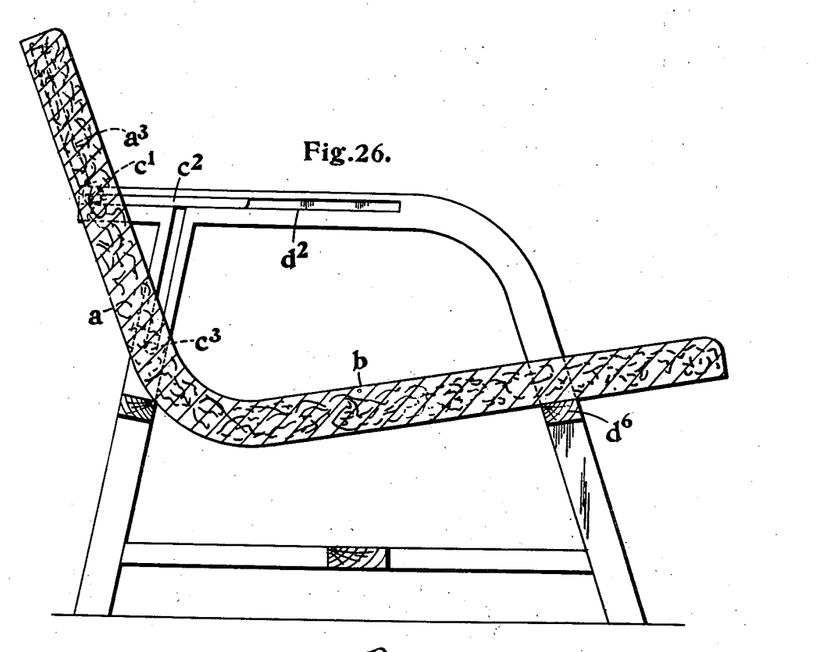
Figures 26 and 27 are sectional elevations of a modification of construction of the chair represented in Figures 1 to 4.
Figure 27:
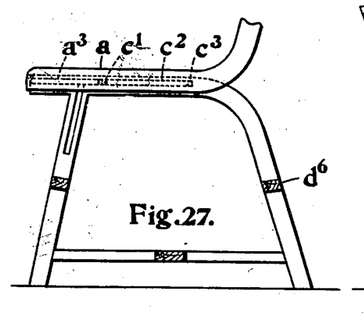

The construction of chair represented in Figures 26 and 27 follows upon the lines of the chair illustrated in Figures 1 to 4. The manner of mounting the seat part and back part upon the supporting frame is, however, modified. The channels $d^2$ are extended to the forward extremities of the upper frame members of the lateral frame parts and the seat part $a$ is provided with pivot pins $c^1$ which support pivotally upon them slide bars $c^2$ adapted to slide in the channels $d^2$, while in spaced relation from the pivot pins $c^1$ there are provided stop pins $c^3$ which also are received in the channels $d^2$. When it is desired to adjust the chair parts from the higher seat position to the lower seat position the combined seat and back parts are moved forwardly upon the supporting frame $d$ so that the slide bars $c^2$ and the stop pins $c^3$ travel along the channels $d^2$ until the stop pins come into a line with the channels $d^3$. The stop pins are then lowered into the channels $d^3$ so that the combined seat and back parts turn about the pivots $c^1$ which are accommodated to the movement of the stop pins by travel of the slide bar $c^2$ in the channels $d^2$. The back part $b$ finally comes to rest upon the tie member $d^6$ and the combined seat and back parts are then supported by the stop pins $c^3$ and the said tie member $d^6$. In order that the seat part $a$ may be adequately supported towards the forward edge when in the higher seat position there are conveniently provided strips or tongues $a^3$ of wood or metal which in the higher seat position lie in alignment with the slide bars $c^2$ in the channels $d^2$.

Figure 28:
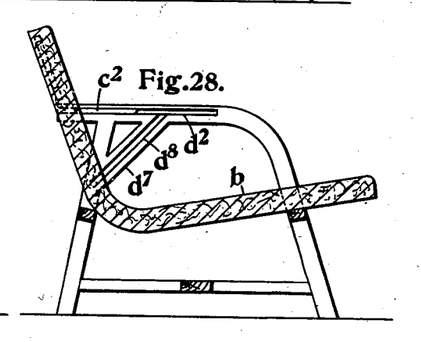
Figure 28 is a sectional elevation of a detail of construction of a further modification of the chair represented in Figures 1 to 4.

The construction of chair represented in Figures 26 and 27 may be modified by the omission of the slide bars in a manner such as that represented in Figure 28. In this construction only the pivot pins $c^1$ and the stop pins $c^3$ are provided, but in the place of the channels $d^3$ the supporting frame is provided with diagonal members $d^7$ in which are formed channels $d^8$ connecting with the channels $d^2$. In this construction in the adjustment of the parts of the chair from the higher seat position to the lower seat posiion the forward movement of the seat part $a$ is effected to the extent to carry the pivot pins $c^1$ and the stop pins $c^3$ so far in the forward direction that the stop pin $c^3$ may enter the channels $d^8$. The combined seat and back parts are then rotated about the pivot pins $c^1$ which accommodate the movement of the stop pins $c^3$ in the channels $d^8$ after movement in the channels $d^2$. In this construction it is unnecessary for the channels $d^2$ to be open at the forward ends except for the purpose of detaching the combined seat and back parts from the supporting frame.

It may be observed that in certain constructions such as that represented in Figures 5 and 6 the pivots $c$ may be supported in movement by helical springs suitably seated within recesses formed in the plates $f$ or in the arcuate members $e$ of the supporting frame.

In all constructions of chair according to the invention it is possible for arms to be provided more particularly in the adjustment of the parts of the chair for the lower seat position by suitable formation of the lateral frame members of the supporting frame. Thus, in the construction represented in Figures 12 and 13 the formation of the supporting frame is such that the arms are provided in the higher and lower seat positions.

Further, in all constructions of chair according to the invention the pivotal axis of the combined seat and back parts may be disposed at any suitable position not less than one-third of the length of the seat part from the front edge of the seat part.

It will be understood that with any of the constructions hereinbefore described in which the back or seat or combined back and seat is mounted upon a stationary or moving axis any simple device may be employed for retaining or securing those ends or parts of the seat or back or the combined seat and back that are remote from the transversely disposed rod or the equivalent upon whose axis the seat or back or the combined seat and back may turn.

The supporting frame, when not of metal, or the back or seat or the combined seat and back are advantageously made of wood, but they may be made of any other material or construction, it being understood that the alternative seat and back or the combined seat and back may be suitably upholstered and both the seat and back or the combined seat and back are advantageously covered completely with the same material.

The supporting frame may be provided so that it may be capable of collapsing or of the ready separation of its parts for space reduction in packing, storage or transport.

It will be understood that in the construction represented in Figure 28 the movement of the pivot pins $c^1$ in the channels $d^2$ during the passage of the stop pins $c^3$ along the channels $d^8$ may be avoided by forming each channel $d^8$ as the arc of a circle the radius of which is the distance of spacing of the pivot pins and the stop pins.

I claim:

1. A chair comprising a combined seat back unit, the two parts of which are disposed in angular relationship to one another, a supporting frame for said unit, and pivotal means for carrying said unit in said frame such that the unit may be rotated in said frame to give two alternative heights of the seating surface above the ground, the said frame also being adapted to be supported by different sides on the ground surface for the alternative seat positions whereby the supporting points on the ground surface in both seating positions may lie approximately vertically below the forward and rearward extremities of the seat back unit.

2. A chair comprising a supporting frame unit having two lateral frame members of similar form arranged in fixed parallel relation, a two-part seat-back unit, the two parts of which are disposed in angular relationship to one another, means movably supporting the seat-back unit on the frame unit including a pivot offset from the vertex of the seat-back unit, said means being arranged to allow one unit to be moved relatively to the other to locate the seat of the seat-back unit at different levels from the ground surface, and means operatively associated with the seat-back unit for supporting the seat at said different levels, said units being so constructed and arranged and so combined with the first named supporting means as to insure that the transverse vertical plane midway between verticals dropped from the front and rear extremities of the seat-back unit and the median transverse vertical plane of the supporting frame unit are sustantially coincident for both positions of the seat-back unit.

3. A chair as claimed in claim 2, in which the pivotal axis of said pivot is arranged horizontally across the supporting frame unit from one frame member to the other.

4. A chair as claimed in claim 2, in which the pivotal axis of said pivot extends transversely across the frame unit and is disposed at a distance more than one-third of the width of one of the parts of the seat-back unit from the free longitudinal edge of that part of the seat-back unit.

5. A chair as claimed in claim 2, in which the area of one part of the seat-back unit differs from the area of the other part of that unit.

6. A chair as claimed in claim 2, in which the supporting frame unit is adapted to be turned through an angle so that it may occupy either of two positions in relation to the ground surface according as the seat is in the higher or the lower position.

7. A chair as claimed in claim 2, including means mounting the pivotal axis to have a limited movement upon the supporting frame unit.

8. A chair as claimed in claim 2, including means disposing the pivotal axis outside the angle formed between the parts of the seat-back unit.

9. A chair as claimed in claim 2, including means wherein said pivotal axis is arranged within the angle formed between the parts of the seat-back unit.

10. A chair as claimed in claim 2, in which each lateral frame member has a portion positioned above the part of the seat-back unit which is in the lower seat position.

11. A chair as claimed in claim 2, in which said pivot is movable relatively to the supporting frame, and stop members on the supporting frame unit cooperating with the pivot to limit the higher and lower positions of the seat.

12. A chair as claimed in claim 2, in which means is provided whereby the pivotal axis of the seat-back unit is movable upon the supporting frame unit, stop means upon said unit, said stop means being adapted to have a limited movement in a direction inclined to or diverging from the path of movement of the pivotal axis.

13. A chair as claimed in claim 2, in which the pivotal axis is adapted to travel in the direction of the length of the upper portions of the lateral frame members and may pass outwardly in relation to said members, and constraining slide bars pivoted upon the pivotal axis and adapted to remain in engagement with slots in said frame members during turning movement of the seat-back unit.

PETER JAMES DAVIS.